United States Patent
Könczöl et al.

(10) Patent No.: US 9,822,692 B2
(45) Date of Patent: Nov. 21, 2017

(54) FUEL GAS FEED AND IGNITION APPARATUS FOR A GAS ENGINE

(71) Applicant: HOERBIGER KOMPRESSORTECHNIK HOLDING GMBH, Vienna (AT)

(72) Inventors: Martin Könczöl, Markt Piesting (AT); Gerhard Kogler, Vienna (AT); Peter Steinrück, Hallstatt (AT)

(73) Assignee: Hoerbiger Kompressortechnik Holding GmbH, Vienna (AU)

( * ) Notice: Subject to any disclaimer, the term of this patent is extended or adjusted under 35 U.S.C. 154(b) by 21 days.

(21) Appl. No.: 14/988,045

(22) Filed: Jan. 5, 2016

(65) Prior Publication Data
US 2016/0195003 A1 Jul. 7, 2016

(30) Foreign Application Priority Data
Jan. 7, 2015 (AT) .............. A 50006/2015

(51) Int. Cl.
*F02B 19/10* (2006.01)
*F02B 19/12* (2006.01)
(Continued)

(52) U.S. Cl.
CPC ............ *F02B 19/108* (2013.01); *F02B 19/12* (2013.01); *F02B 43/00* (2013.01);
(Continued)

(58) Field of Classification Search
CPC ... F02B 19/108; F02B 19/12; F02M 21/0248; F02M 21/0275; F02M 45/086; F02M 43/04; F02D 19/10; Y02T 10/36
(Continued)

(56) References Cited

U.S. PATENT DOCUMENTS

| 2,799,255 A | 7/1957 | Gehres |
| 5,199,398 A | 4/1993 | Nylund |

(Continued)

FOREIGN PATENT DOCUMENTS

| CA | 2743043 | 8/2011 |
| DE | 19622945 | 12/1997 |

(Continued)

OTHER PUBLICATIONS

English Abstract of JP1026058.
English Abstract of DE 19622945.
English Abstract of DE 102013009413.

*Primary Examiner* — Joseph Dallo
*Assistant Examiner* — Yi-Kai Wang
(74) *Attorney, Agent, or Firm* — Dykema Gossett PLLC (57) ABSTRACT

A fuel gas feed and ignition apparatus for a gas engine (1) with a combustion chamber includes a number of injection channels (37), a main fuel gas feed line (24) for main fuel gas in which a main fuel gas valve (21) is arranged, and a number of torch channels (52) for hot combustion gas connected to a pre-combustion chamber (15), wherein an ignition fuel supply line (17) leads to the pre-combustion chamber (15) and a pre-combustion chamber valve (18) is arranged in the ignition fuel supply line (17). Control of both the time and the duration and thus also the quantity of the injection of main fuel gas, as well as of ignition fuel for the pre-combustion chamber completely independently of one another and in a precise and, above all, rapid manner is achieved in that both the main fuel gas valve (21) and the pre-combustion chamber valve (18) are embodied as an electrically-actuated, electronically-controlled valve.

16 Claims, 6 Drawing Sheets

(51) Int. Cl.
  *F02M 21/02*  (2006.01)
  *F02B 43/00*  (2006.01)
  *F02D 19/06*  (2006.01)
  *F02M 45/08*  (2006.01)
  *F02M 61/02*  (2006.01)
  *F02M 61/18*  (2006.01)

(52) U.S. Cl.
  CPC ..... *F02D 19/0642* (2013.01); *F02M 21/0248* (2013.01); *F02M 21/0275* (2013.01); *F02M 45/08* (2013.01); *F02M 61/02* (2013.01); *F02M 61/1813* (2013.01); *Y02T 10/125* (2013.01); *Y02T 10/32* (2013.01); *Y02T 10/36* (2013.01)

(58) Field of Classification Search
  USPC .......................................................... 123/253
  See application file for complete search history.

(56) References Cited

U.S. PATENT DOCUMENTS

| | | | |
|---|---|---|---|
| 5,251,594 A * | 10/1993 | Meyer | F01C 9/005 123/228 |
| 8,800,529 B2 | 8/2014 | Wickstone et al. | |
| 9,200,560 B2 | 12/2015 | Coldren et al. | |
| 2005/0274828 A1* | 12/2005 | Kurz | F02M 45/086 239/533.2 |
| 2011/0186647 A1* | 8/2011 | Bernhaupt | F02M 47/027 239/5 |
| 2012/0125279 A1* | 5/2012 | Hampson | H01T 13/54 123/169 R |
| 2012/0291759 A1* | 11/2012 | Bernhaupt | F02M 47/027 123/541 |
| 2014/0196686 A1* | 7/2014 | Coldren | F02B 19/12 123/299 |
| 2015/0075506 A1* | 3/2015 | Ishida | F02D 41/402 123/65 R |

FOREIGN PATENT DOCUMENTS

| | | |
|---|---|---|
| DE | 102013009413 | 12/2014 |
| EP | 0778410 | 8/1997 |
| JP | 1026058 | 1/1998 |
| WO | 2012072881 | 6/2012 |
| WO | 2014186893 | 11/2014 |

* cited by examiner

FUEL GAS FEED AND IGNITION APPARATUS FOR A GAS ENGINE

BACKGROUND OF THE INVENTION

Field of the Invention

The present invention relates to a fuel gas feed and ignition apparatus for a gas engine, with a combustion chamber injection nozzle having a number of injection channels for a main fuel gas that are distributed over the periphery of the combustion chamber injection nozzle, wherein the injection channels are connected to a main fuel gas feed line for main fuel gas, and further a number of torch channels are provided in the combustion chamber injection nozzle, the torch channels being connected with a pre-combustion chamber in the fuel gas feed and ignition apparatus, wherein an ignition fuel feed line leads into the pre-combustion chamber and a pre-combustion chamber valve being arranged in the ignition fuel feed line, wherein the pre-combustion chamber valve is embodied as electrically-actuated, electronically-controlled valve. Furthermore, the invention relates to a method for operating a gas engine, wherein during the compression stroke, air or an air/exhaust gas mixture is compressed in a cylinder of the gas engine and the compressed air is pressed into a pre-combustion chamber, into which pre-combustion chamber an ignition fuel is fed to form an air/ignition fuel mixture, a main fuel gas is fed into a main combustion chamber of the cylinder before the end of the compression stroke, and the air/ignition fuel mixture is ignited in the pre-combustion chamber, whereby hot combustion gas flows from the pre-combustion chamber into the main combustion chamber and ignites the injected main fuel gas there.

In accordance with the present invention, a gas engine is understood as an internal combustion engine with a piston, particularly with a reciprocating piston, i.e., a piston engine.

The Prior Art

The known combustion methods of gas engines with external ignition are based on the principle that either the combustible mixture is fed to the working space during the filling of the cylinder in the suction cycle or is formed in the working space through the injection of fuel gas during the compression stroke. The combustible mixture is then ignited through spark ignition or injection of a small quantity of self-igniting liquid fuel. Here, the fuel provided for combustion is already mixed with the combustion air upon ignition. The ignition can occur directly in the cylinder or indirectly through ignition in a pre-combustion chamber. The ignition occurs in the pre-combustion chamber through spark ignition, which causes a hot gas jet to emerge from the pre-combustion chamber into a main combustion chamber (cylinder) that ignites the combustible mixture in the main combustion chamber, the combustible mixture then being migrated by the generally turbulent flame fronts. As a result of the ignition in the main combustion chamber and the increase in pressure achieved in this way, the desired mechanical effective work is performed in the work cycle on the piston.

These established and fundamentally robust combustion methods all have the drawback that they tend to produce misfires or preignitions with an unfavorable fuel/air ratio, which can lead to high levels of pollutant emissions, poor efficiency and/or extreme mechanical loads. Such misfires or preignitions endanger the safe and reliable operation of the gas engine. In particular, quick load changes can lead to the abovementioned unfavorable variations of the fuel/air ratio. As a result, the use of gas engines is limited when high demands are placed on load change speed.

One known solution for overcoming this drawback can be found, for example, in U.S. Pat. No. 8,800,529 B2, in which an air-intake combustion method is described in which air is drawn in during the suction cycle and compressed during the compression stroke, and the main fuel gas, similarly to diesel fuel in auto-igniting diesel engines, is injected via a multi-hole nozzle only just before the piston reaches top dead center. Due to the fact that gas has a very high auto-ignition temperature, the main fuel gas is ignited by means of a so-called pilot injection, in which a small quantity of self-igniting liquid fuel is injected into the main combustion chamber. The combustion of the main fuel gas then occurs as diffusion combustion along the surface of the main fuel gas jets. As is known, diffusion combustion takes place without the pre-mixing of air and fuel in that the oxygen required for combustion diffuses into the flame via the flame edge. The flame thus "draws" oxygen for combustion from the immediate surroundings. The flame therefore has an Increasingly poorer supply of oxygen toward the flame inner core, and the fuel combusts only partially in the flame inner core. However, since only air is compressed in this combustion method, there is no danger of preignition. Misfires are prevented by the very reliable auto-ignition of the liquid fuel during pilot injection.

EP 520 659 A1 and EP 778 410 A1 disclose injection valves for such a combustion method, also called dual-fuel valves. In the injection valve, the valves for the injection of gaseous fuel for the combustion and of liquid fuel for the pilot injection for ignition are arranged concentrically.

The essential drawback of this combustion method lies in the necessity of providing two fuels, namely high-pressure gas as the main fuel gas and diesel fuel for the pilot injection, and of providing the dual storage and supply devices required for this purpose.

U.S. Pat. No. 2,799,255 A describes a gas engine with air intake and external ignition that is operated with natural gas and works according to the diffusion combustion principle. To enable the safe and reliable ignition of the gas engine in all load ranges while avoiding misfires and preignitions, a pre-combustion chamber is provided that is connected via a flow channel to the cylinder chamber or more specifically to the main combustion chamber in the cylinder.

During compression, air in the cylinder is compressed, and the compressed air is fed simultaneously into the pre-combustion chamber. Pressurized fuel is fed into the pre-combustion chamber, which mixes with the compressed air in the pre-combustion chamber. The mixture ratio between fuel and air in the pre-combustion chamber should be set up such that the fuel/air-mixture cannot ignite on its own. Before the end of the compression stroke, gaseous main fuel in the quantity required for the respective load is fed into the main combustion chamber. Just before the end of the compression stroke, the fuel/air-mixture in the pre-combustion chamber is ignited by means of a spark plug. The hot combustion gas flows through the flow channel into the main combustion chamber. The flow of the gaseous main fuel is directed into this gas flow, whereby a turbulent mixing of the main fuel with the compressed air occurs and whereby the main fuel/air mixture is ignited. The combustion of the main fuel/air mixture takes place along a flame front in the form of a diffusion combustion method.

Controlling the supply of fuel into the pre-combustion chamber and of main fuel in the main chamber is achieved in U.S. Pat. No. 2,799,255 A through mechanical forced control by means of a cam drive. The cam shaft actuates a rocker arm that acts on valve tappets of the valves for the fuel and the main fuel, the valve tappets also being forced into synchronization via the rocker arm. The supplied quantity of fuel or main fuel is thus established, as is the resulting fuel/air mixture and main fuel/air mixture. However, autoignition cannot be reliably prevented due to compressive heating. Likewise, misfires as a result of an excessively lean mixture in the pre-combustion chamber cannot be ruled out. This can be problematic, particularly if the fuel or the main fuel is supplied in varying qualities, which can certainly be the case with natural fuels such as natural gas. In U.S. Pat. No. 2,799,255 A, this situation could only be improved by changing the pressure of the fuel and/or main fuel in order to achieve the necessary adjustment. Due to the inherent lethargy of pressure regulation, the injection therefore cannot be updated quickly enough during fast load changes, for which reason reliable ignition, particularly in the case of fast load changes, cannot be guaranteed.

DE 10 2014 000 229 A1 also describes a gas engine with a diffusion combustion method. In that method, the quantity of main fuel for combustion in the main combustion chamber can only be controlled indirectly via a needle valve member that is actuated by a control valve on the low-pressure side of the needle valve member. This makes it more difficult to control the quantity of the main fuel gas injection and thus the combustion in the main combustion chamber.

SUMMARY OF THE INVENTION

In order to resolve the problems of the known prior art, a provision is made according to the invention that a main fuel gas valve is provided in the main fuel gas supply line that is embodied as an electrically actuated, electronically controlled valve, and, in addition to the pre-combustion chamber valve, the main fuel gas valve is also embodied as an electrically actuated, electronically controlled valve. This makes it possible, on the one hand, to control both the timing and the duration and thus the quantity of the injection of main fuel gas as well as of the ignition fuel for the pre-combustion chamber completely independently of each other in a precise and, above all, fast manner. In this way, it is possible to both react quickly to the changing characteristics of the main fuel gas and/or of the ignition fuel and also adapt the injection to different load states. In particular, this also ensures reliable ignition and optimal combustion in the case of rapid load changes. The fuel gas feed and ignition apparatus according to the Invention can be used both for 4-stroke and 2-stroke gas engines.

However, an especially advantageous ignition method can also be realized through the use of electrically actuated, electronically controlled valves. Before the ignition of the air/ignition fuel mixture in the pre-combustion chamber, ignition fuel is again fed into the pre-combustion chamber in order to enrich the air/Ignition fuel mixture in the pre-combustion chamber. By virtue of this multiple injection, a very lean air/ignition fuel mixture is produced with a first injection in the pre-combustion chamber that will certainly not ignite on Its own. Only at the time of a desired ignition is the air/ignition fuel mixture enriched through a second injection and ignited externally. In addition, the temperature of the air/Ignition fuel mixture in the pre-combustion chamber is also reduced through the second injection, which further reduces the danger of an undesired preignition. Premature ignitions and misfires can thus be prevented for the most part.

On the other hand, a mechanical, differential-pressure-actuated valve that is controlled by the pressure of the main fuel gas and that releases or blocks the injection channels is provided according to the invention between the main fuel gas supply line and the injection channels. For one, this makes it possible for the main fuel gas valve to be arranged locally at a distance from the regions subjected to high thermal loads. For another, this also makes for a very compact design for the fuel gas feed and ignition apparatus, which can thus be arranged in the region of the cylinder head in which the valves are also arranged. Lastly, the resulting clearance volume for the main fuel gas can be reduced, whereby the pollutant emissions of the gas engine can also be reduced and less space prone to fouling is present.

If a plurality of torch channels for hot combustion gas are arranged so as to be distributed over the periphery of the combustion chamber injection nozzle that are connected to the pre-combustion chamber, it is possible on the one hand to realize a very compact design of the fuel gas feed and ignition apparatus. On the other hand, a plurality of diffusion flames are ignited which optimally draw in the oxygen available for combustion in the main combustion chamber, whereby a stable, well-controlled and fast combustion occurs. As a result, the quality and efficiency of the combustion can be improved and the pollutant emissions of the gas engine can be reduced.

It is especially advantageous if the injection channels and torch channels are arranged next to one another so as to alternate in the circumferential direction. With such an arrangement star-shaped inflows of main fuel gas and hot combustion gas into the main combustion chamber are offset in the circumferential direction, thus enabling reliable ignition and an especially good spatial distribution of the diffusion flames in the main combustion chamber. This can be improved even further by arranging the opening regions of the injection channels and the torch channels in the main combustion chamber at substantially the same axial position of the combustion chamber injection nozzle.

Through the radial orientation of the opening regions of the injection channels and the torch channels in the main combustion chamber, a maximally unhindered inflow of main fuel gas and hot combustion gas into the main combustion chamber is achieved. This improves the stable and well-controlled combustion even further.

If an annular pre-combustion chamber groove is arranged in the fuel gas feed and ignition apparatus that is connected via a pre-combustion chamber line to the pre-combustion chamber and into which the torch channels lead to, a very compact design of the fuel gas feed and ignition apparatus can be achieved.

The mechanical valve is preferably embodied as a valve tappet with a first piston at an axial end and with a second piston spaced apart axially from the first piston, whereas the first piston being connected by a shaft to the second piston, and a control chamber connected to the main fuel gas feed line being embodied between the first and second pistons. A differential piston is thus realized that can be controlled by the acting pressures. The mechanical valve can thus be used in different gas engines while retaining the same geometry.

For this purpose, for a simple structural design, a piston sealing surface can advantageously be provided on the first piston that cooperates in a sealing manner with a valve sealing surface in the fuel gas feed and ignition apparatus, and the second piston can be arranged in a control recess of the fuel gas feed and ignition apparatus, whereas the circumferential surface of the second piston cooperating in a sealing manner with the control recess.

In order to limit the movement of the valve tappet to the required amount, a provision is advantageously made that a stop pin is axially adjacent to the second piston that cooperates with a stop in the fuel gas feed and ignition apparatus. In this way, it is particularly possible to also keep the closing speed down, since only the distance required for the function need be traveled.

If a spring is arranged around the stop pin between stop and second piston, the spring can support the closing movement and also provide for a defined position of the mechanical valve.

In one especially advantageous embodiment, the second piston is arranged in a valve housing in which a valve stop is embodied that cooperates in a sealing manner with an end face of the second piston. As a result, the leakage of main fuel gas through the mechanical valve can be reduced on the one hand and, on the other hand, the mechanical valve can thus be embodied as an insert that can easily be exchanged.

With a valve spring between the end face of the second piston and the valve housing, the closing movement can again be supported and a defined position provided for the mechanical valve.

Due to the thermal conditions in the fuel gas feed and ignition apparatus, it can be advantageous if a number of sealing elements are arranged on the circumferential surface of the second piston. The sealing elements can be adapted to the thermal loads. Moreover, by virtue of the sealing elements, excess leakage of main fuel gas can effectively be prevented.

In order to discharge leakage of main fuel gas, a provision can be made that a leakage line leads to the end of the control recess facing away from the control chamber and closed off by the second piston.

In a very especially advantageous embodiment, a provision can be made that the leakage line is connected to an ignition fuel supply line. Possible leakage of main fuel gas in the pre-combustion chamber is thus utilized, which increases the efficiency of the gas engine. It is very especially advantageous here if the same medium is used for the main fuel gas and the ignition fuel for the pre-combustion chamber, which medium only lies at a different pressure level if need be. Apart from that no leakage line leading away from the gas engine is necessary.

The present invention is explained in further detail below with reference to FIGS. 1 to 10, which show advantageous embodiments of the invention in an exemplary, schematic and non-limitative manner.

DETAILED DESCRIPTION OF THE INVENTION

Figure 1:
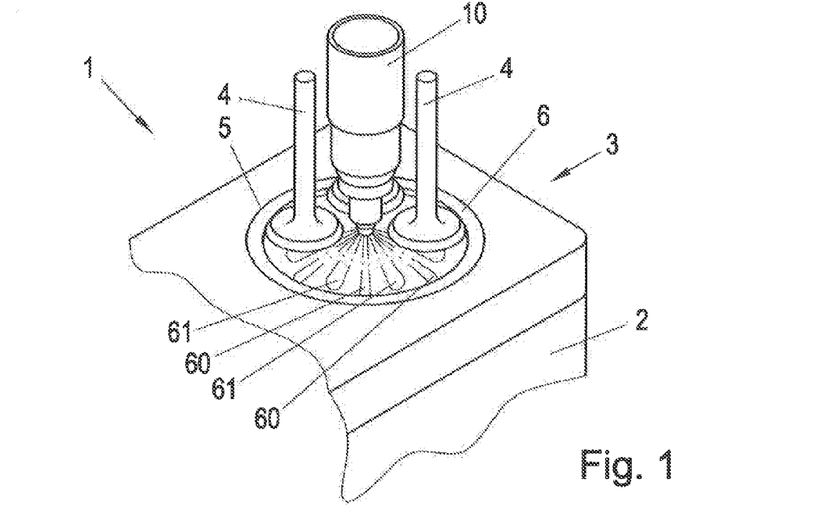
FIG. 1 shows a view of a fuel gas feed and ignition apparatus according to the invention.

FIG. 1 shows a detail of a gas engine 1 with a cylinder block 2 and a cylinder head 3, merely indicated, with valves 4. A cylinder 5 is arranged in the cylinder block 2 in which a piston 6 reciprocates. This basic construction and function of such a piston internal combustion engine is sufficiently known, for which reason it will not be discussed here in any further detail. Moreover, a fuel gas feed and ignition apparatus 10 according to the invention is arranged in the cylinder head 3 with which main fuel gas is fed into the main combustion chamber 11 of the cylinder 5 (see FIG. 2), and with which the combustion is ignited in the main combustion chamber 11, as will be explained below in detail.

Figure 2:
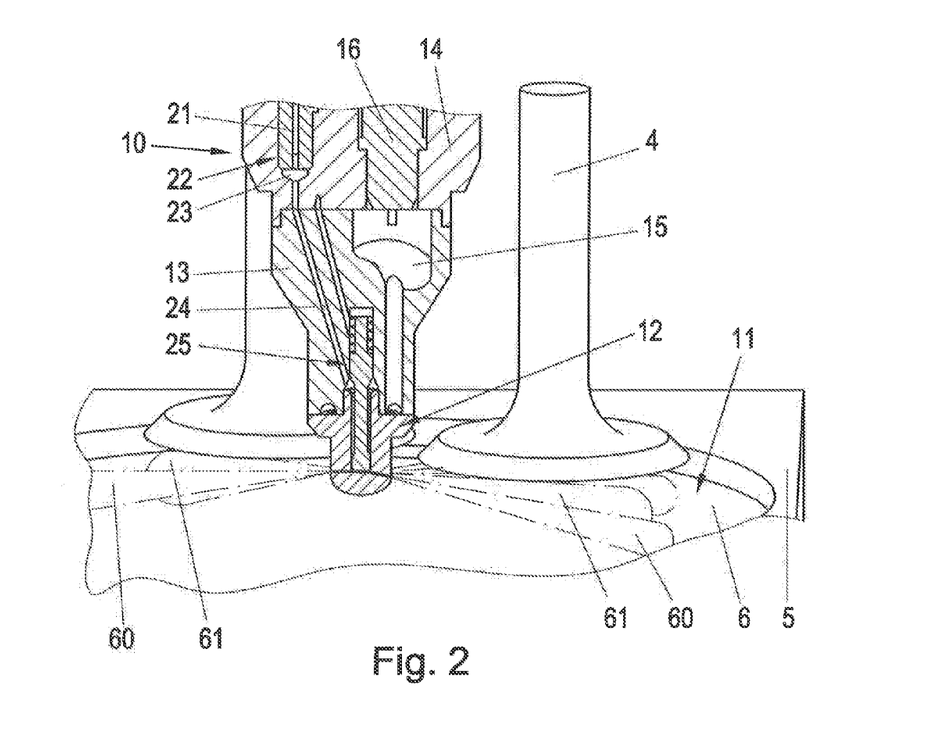
FIG. 2 shows a section through the fuel gas feed and ignition apparatus according to FIG. 1, FIGS. 3, 4, 6, 7 and 9 show sections of details of the fuel gas feed and ignition apparatus according to the invention.
Figure 10:
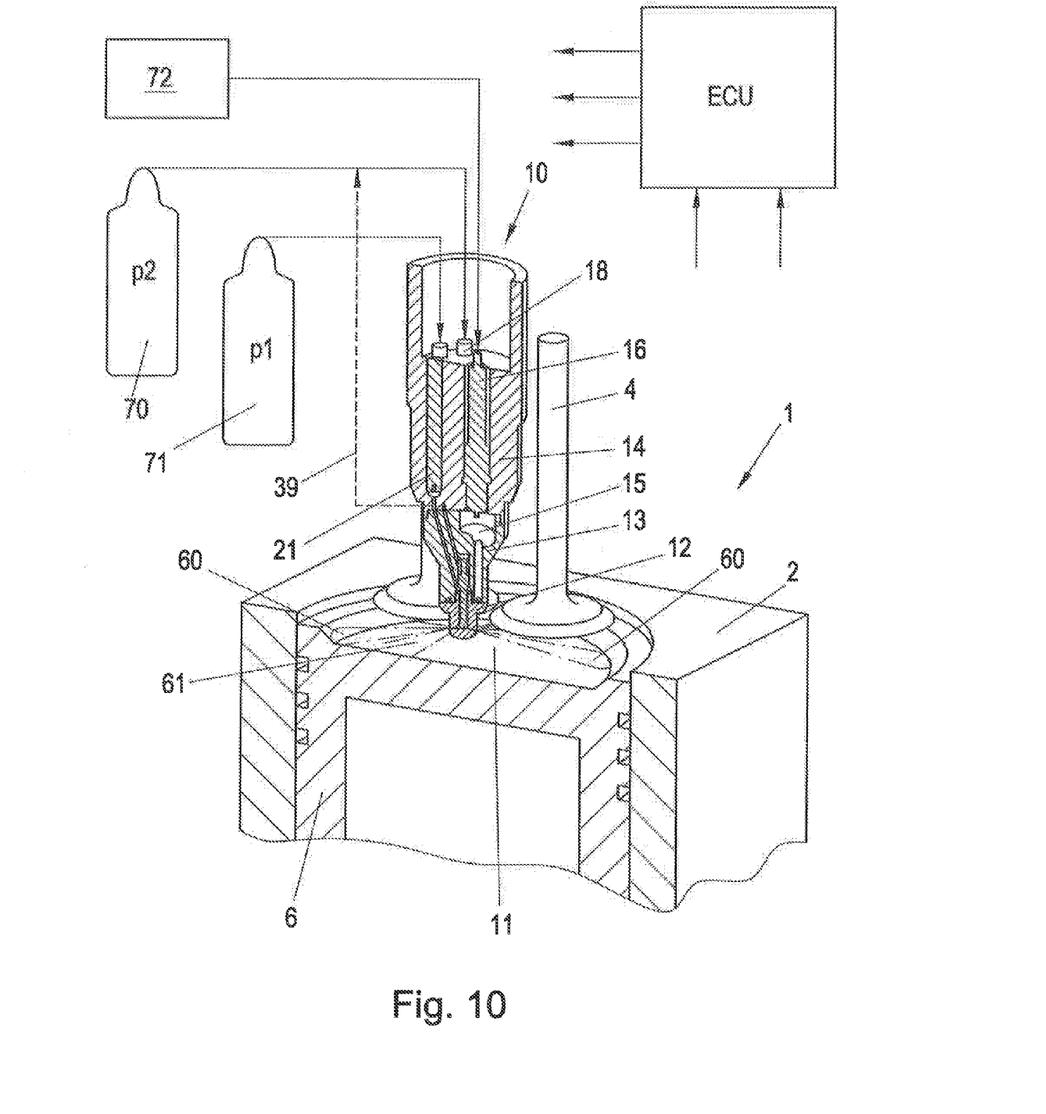
FIG. 10 shows the fuel gas feed and ignition apparatus according to the invention with connectors and controller.

FIG. 2 shows an enlarged section through the cylinder 5 and the fuel gas feed and ignition apparatus 10 with their main parts. The fuel gas feed and ignition apparatus 10 is arranged in the cylinder head 3 such that it projects with a combustion chamber injection nozzle 12 into the main combustion chamber 11, which is formed substantially by the open space in the cylinder 5 between the piston 6 and the cylinder head 3. The combustion chamber injection nozzle 12 is arranged at an axial end of the fuel gas feed and ignition apparatus 10. The combustion chamber injection nozzle 12 is arranged on a middle part 13 of the fuel gas feed and ignition apparatus 10, which, in turn, is arranged on an upper part 14 of the fuel gas feed and ignition apparatus 10 (the parts 13 and 14 providing a housing). The connections for ignition fuel, main fuel gas, control lines, electrical supply, etc., as shown in FIG. 10, are also provided on the upper part 14, as will be described in detail below.

The subdivision into combustion chamber injection nozzle 12, middle part 13, and upper part 14 is of course arbitrary. The fuel gas feed and ignition apparatus 10 described here results in a fuel gas feed and ignition apparatus 10 that lends itself favorably to manufacturing techniques.

A pre-combustion chamber 15 is provided in the fuel gas feed and ignition apparatus 10, here in the middle part 13, that is formed substantially as a recess in the middle part 13. An external ignition device 16, such as, for example, a spark-discharge spark plug, a corona spark plug, a plasma-spark plug, a laser ignition device, etc., ends in the pre-combustion chamber 15.

Figure 3:
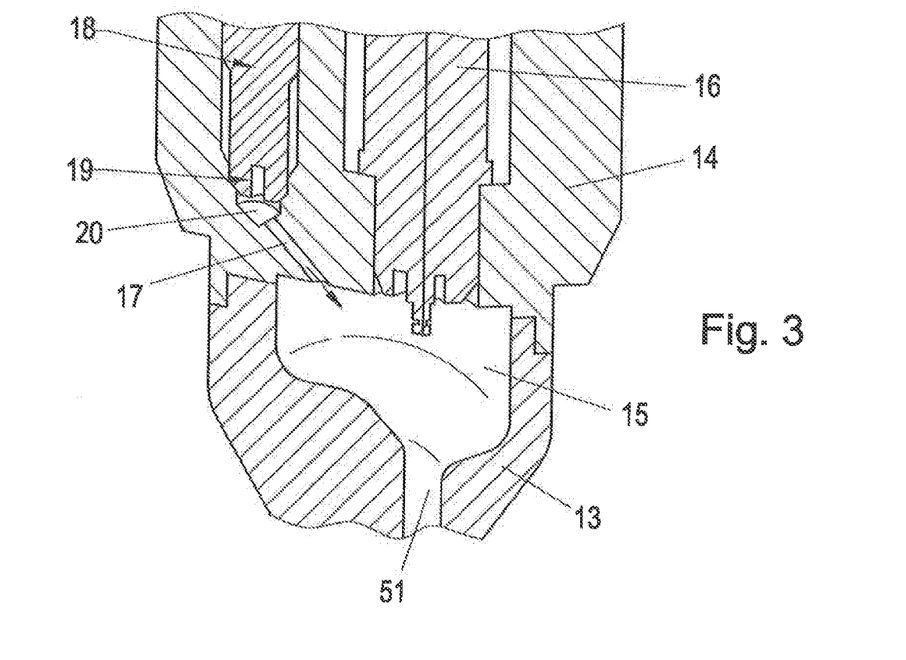
Figure 4:
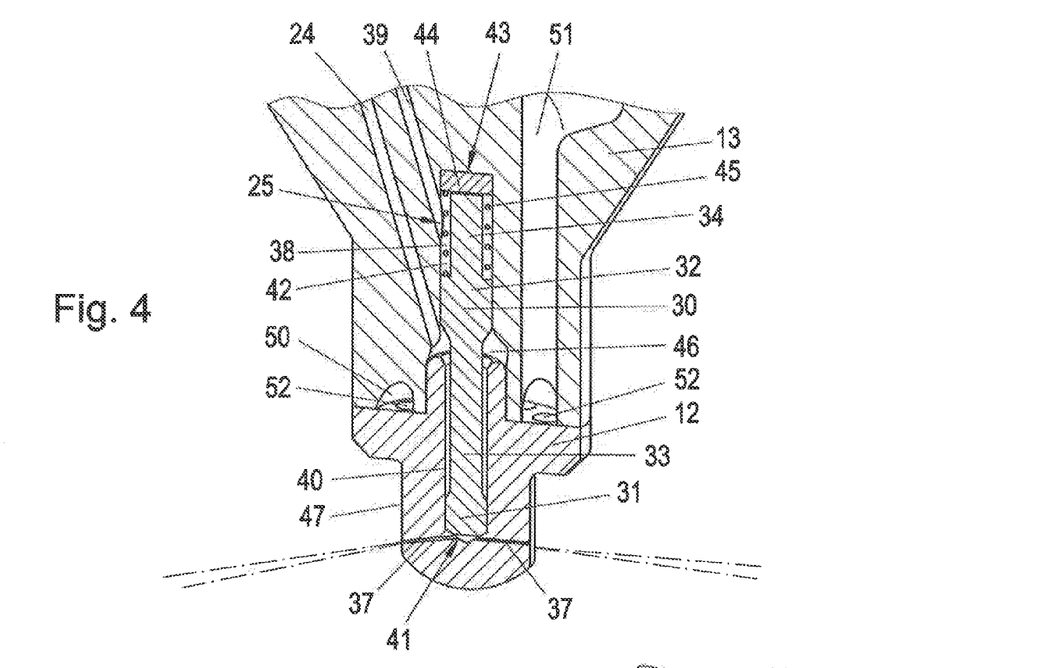

An ignition fuel feed line 17 for ignition fuel for the pre-combustion chamber 15, in which a pre-combustion chamber valve 18 is arranged, also leads to the pre-combustion chamber 15, as shown in FIG. 3, which shows a different section plane. For this purpose, the pre-combustion chamber valve 18 can be embodied as an electrically-actuated, electronically-controlled pre-combustion chamber valve 18, for example a solenoid valve for gaseous fuels, and can be arranged in the upper part 14. In the depicted exemplary embodiment, the injector nozzle 19 of the pre-combustion chamber valve 18 leads to an ignition fuel chamber 20 that transitions into the ignition fuel feed line 17. It is thus possible to feed ignition fuel via the pre-combustion chamber valve 18 and the ignition fuel feed line 17 into the pre-combustion chamber 15, as indicated by the arrow in FIG. 3.

A preferably electrically-actuated and electronically-controlled main fuel gas valve 21 is also arranged in the upper part 14, whose injector nozzle 22 leads to a main fuel gas chamber 23 (FIG. 2). The main fuel gas chamber 23 transitions into a main fuel gas feed line 24, through which the main fuel gas can be fed into the combustion chamber injection nozzle 12. Generally speaking, the main fuel gas valve 21 is arranged in the main fuel gas feed line 24 and controls the supply of main fuel gas into the main combustion chamber 11.

A mechanical, differential pressure-actuated valve 25 is also arranged in the fuel gas feed and ignition apparatus 10 according to the described advantageous embodiment, here partially in the middle part 13 and partially in the combustion chamber injection nozzle 12. The mechanical valve 25 will now be described in detail with reference to FIGS. 4 to 6.

Figure 5:
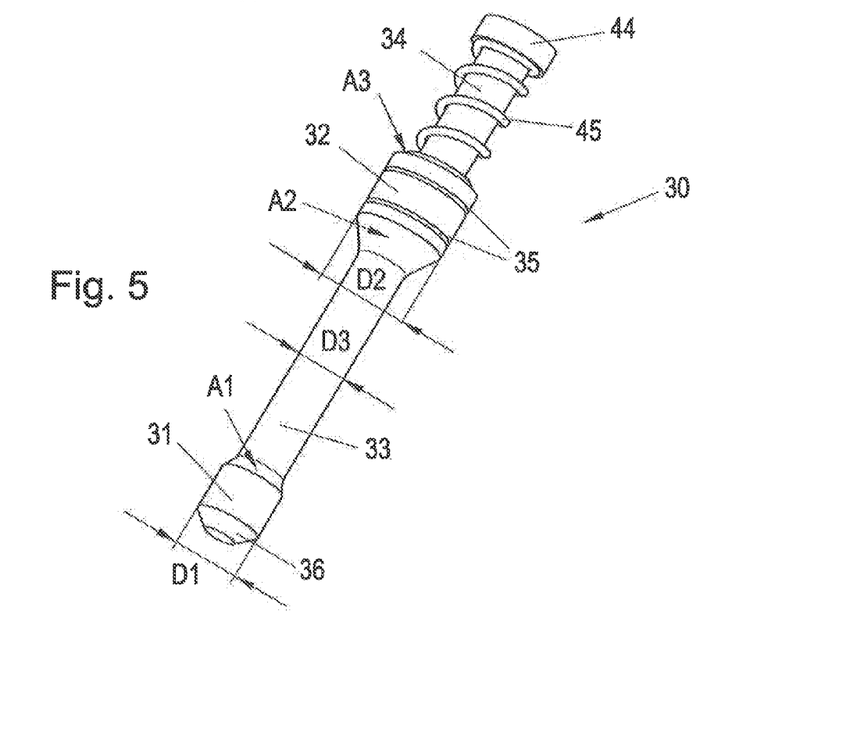
FIG. 5 shows the valve tappet of the mechanical valve of the fuel gas feed and ignition apparatus according to FIG. 2.

The mechanical, differential pressure-actuated valve 25 consists of a valve tappet 30 in the form of a differential piston. The valve tappet 30 comprises a first piston 31 at an axial end of the valve tappet 30 and a second piston 32 that is arranged so as to be spaced apart from the first piston 31 in axial direction. The first piston 31 and the second piston 32 are interconnected by a shaft 33 to form the valve tappet 30. The diameter D1 of the first piston 31 and the diameter D2 of the second piston are both larger than the diameter D3 of the shaft 33, whereby, starting from the shaft 33, a first piston surface A1 is formed on the first piston 31 and a second piston surface A2 is formed on the second piston 32. A stop pin 34 can be axially adjacent to the second piston 32 that forms the second axial end of the valve tappet 30. Sealing elements 35 can be arranged on the outer circumferential surface of the second piston 32.

Figure 6:
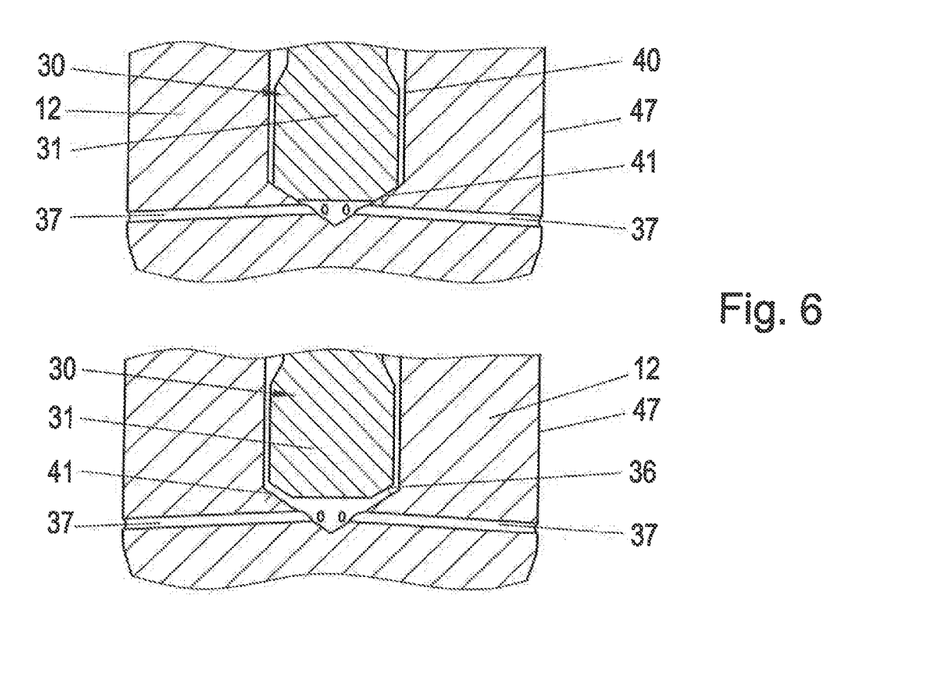

An axial, non-continuous valve recess 40, here in the form of a blind hole, is provided in the combustion chamber injection nozzle 12, whose axial, closed end forms a valve sealing surface 41 that cooperates in a sealing manner with an associated piston sealing surface 36 on the first piston 31 (FIG. 6). To form a valve, the valve tappet 30 is arranged with its first axial end with the first piston 31 in the valve recess 40. In the depicted exemplary embodiment, the piston sealing surface 36 is provided on the free end face of the first piston 31, and the valve sealing surface 41 is formed by the axial end of the valve recess 40. The first piston 31 is spaced radially apart from the valve recess 40, whereby main fuel gas can flow around and along the first piston 31. The geometric shape of the valve sealing surface 41 and the piston sealing surface 36 plays no role here.

The closed axial end of the valve recess 40 is connected via a plurality of radially aligned continuous injection channels 37 in the combustion chamber injection nozzle 12 to external openings 37a (first set of openings) in the outer circumferential surface 47 of the combustion chamber injection nozzle, and thus, in the installed position, also to the main combustion chamber 11, with the first piston 31 either blocking (top of FIG. 6) or releasing (bottom of FIG. 6) the flow of main fuel gas to the injection channels 37, depending on the position of the valve tappet 30. The injection channels 37 an external openings 37a are arranged so as to be distributed over the periphery of the combustion chamber injection nozzle 12, preferably in regular intervals. Through the radial alignment of the injection channels 37, a radial inflow of the main fuel gas into the main combustion chamber 11 is achieved. Optionally, the injection channels 37 can also have a slightly tangential orientation in order to achieve a tangential inflow component as well.

An axial, non-continuous control recess 42 is provided in the middle part 13 that is arranged coaxially to the valve recess 40 and adjacent thereto. The second axial end with the second piston 32 of the valve tappet 30 is arranged in the control recess 42. The circumferential surface of the second piston 32 is sealed off with respect to the control recess 42, for example by means of the sealing elements 35, e.g., in the form of sealing rings similar to the piston rings of a combustion piston.

The valve tappet 30 is arranged in the valve recess 40 and the control recess 42 so as to be moveable in the axial direction. The axial, closed end of the control recess 42 forms a stop 43 for the valve tappet 30. Optionally, a stop ring 44 can also be arranged in the control recess 42 in order to adjust the position of the stop 43. A valve spring 45 is arranged around the stop pin 34 between the stop 43 and the end face 55 of the second piston 32 that presses the valve tappet 30, or more specifically the piston sealing surface 36 of the first piston 31, against the valve sealing surface 41 into a defined position.

The main fuel gas feed line 24 leads into the control chamber 46, which is formed in the fuel gas feed and Ignition apparatus 10 by the valve recess 40 and the control recess 42 between the first piston 31 and the second piston 32. The diameter D1 of the first piston 31 is smaller than the diameter D2 of the second piston 32, so that the first piston surface A1 is smaller than the second piston surface A2. As the main fuel gas flows around the first piston 31 and thus also acts against the accessible region (the region up to the piston sealing surface 36) of the end face of the first piston 31 facing toward the main combustion chamber 11, the first piston 31 is partially or completely pressure-equilibrated with respect to the pressure of the main fuel gas, depending on the geometry and position of the valve tappet 30. If pressurized main fuel gas is now supplied via the main fuel gas valve 21 and the main fuel gas feed line 24 into the control chamber 46, a valve force is exerted by the larger piston surface A2 on the second piston 32 that presses the valve tappet 30 against the pressure acting in the valve recess 42 or in the spring chamber 38, and optionally against the preload force of the spring 35 if provided, against the stop 43. As a result, the piston sealing surface 36 of the first piston 31 is of course also lifted from the valve sealing surface 41 (bottom of FIG. 6), whereby the injection channels 37 are released and the pressurized main fuel gas can flow into the main combustion chamber 11.

If the main fuel gas valve 21 is closed again, whereby the pressure in the control chamber 46 drops quickly, the pressure in the spring chamber 38 and/or the spring 35 presses the valve tappet against the valve sealing surface 41 again, thus preventing the injection of main fuel gas into the main combustion chamber 11. With the electrically actuated, electronically controlled main fuel gas valve 21, it is thus very easy to control both the start of the injection and the quantity of injected main fuel gas, for example through the end of the injection as a function of the current pressure of the main fuel gas.

Due to the necessarily high pressures of the main fuel gas and the high temperatures in the region of the main combustion chamber 11, it is generally not possible to use elastomer seals as sealing elements 35 in the second piston 32. If sealing rings similar to piston rings are used as sealing elements 35, leakage of main fuel gas unavoidably occurs along the circumferential surface of the second piston 32. It is therefore possible in an advantageous embodiment for a leakage line 39 to lead into the spring chamber 38 formed in the control recess 42 between the second piston 32 and the stop 43. Any leakage of main fuel gas between the piston 32 and control recess 42 can be discharged via this leakage line 39.

If the same medium is used as ignition fuel and main fuel gas, e.g. natural gas, an especially advantageous embodiment can be realized. The leakage line 39 is connected for this purpose to the ignition fuel supply line to the pre-combustion chamber valve 18 of the pre-combustion chamber 15 (indicated in FIG. 10). At the moment of the injection of main fuel gas, the quantity of leakage that occurs is conducted via the leakage line 39 to the pre-combustion chamber valve 18 and is consumed there, thus eliminating the loss of main fuel gas. If the main fuel gas valve 21 is closed again after the injection, the pressure in the control chamber 46 quickly drops. However, since the leakage line 39 is now connected to the pressurized ignition fuel supply line, the pressure of the ignition fuel for the pre-combustion chamber 15 acts on the piston surface A3 on the second piston 32 facing toward the spring chamber 38, thereby resulting in a closing force that attempts to press the valve tappet 30 against the valve sealing surface 41. This closing force counteracts a counterforce that is brought about on the one hand by the effective differential pressure between the spring chamber 38 and control chamber 46 and on the other hand by the pressure in the main combustion chamber 11 that also acts via the injection channels 37 on a portion of the free end face of the first piston 31. As soon as the generated closing force is greater than the counterforce, the mechanical valve 25 is closed. If present, the valve spring 45 supports the closing force. However, the valve spring 45 can also be dimensioned so weak that it practically only ensures a defined position of the valve tappet 30. In this embodiment, however, the valve spring 45 could be omitted entirely, since the mechanical valve 25 is closed by the pressure of the ignition fuel for the pre-combustion chamber 15 and is opened by the pressure of the main fuel gas.

The geometry of the valve tappet 30 and the valve spring 35 can of course be adapted to the pressures of ignition fuel and main fuel gas in order to ensure the proper function of the mechanical, differential pressure-actuated valve 25.

The embodiments described above enable a very compact design of the mechanical valve 25, and particularly also a spatial separation from the main fuel gas valve 21. It is thus also possible to separate the main fuel gas valve 21 spatially from the parts of the fuel gas feed and ignition apparatus 10 in the immediate vicinity of the main combustion chamber 11 that are subject to high thermal loads. Another advantage of these embodiments is that the clearance volume in the fuel gas feed and ignition apparatus 10 is limited substantially to the injection channels 37 and can thus be minimized to the greatest possible extent, which is advantageous particularly in terms of avoiding or minimizing the formation of soot or uncombusted exhaust gas components. Not least, a very compact design of the entire fuel gas feed and ignition apparatus 10 is thus also made possible, which enables installation in a water-cooled block of the gas engine 1, whereby a durable and reliable design can be achieved.

Figure 7:
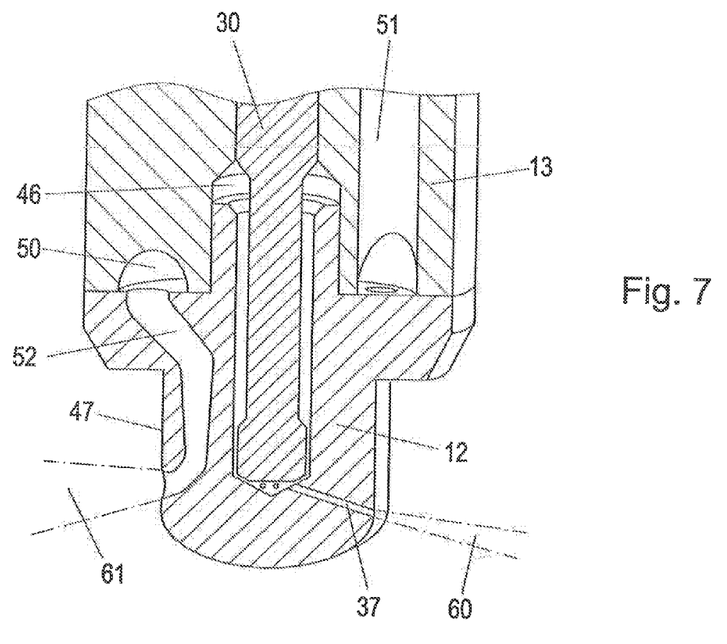

Moreover, an annular pre-combustion chamber groove 50 is provided in the fuel gas feed and ignition apparatus 10, here at the axial end of the middle part 13 facing toward the combustion chamber injection nozzle 12, that is connected via a pre-combustion chamber line 51 to the pre-combustion chamber 15. However, the pre-combustion chamber groove 50 could also be arranged in the combustion chamber injection nozzle 12. A number of torch channels 52 are arranged in the combustion chamber injection nozzle 12 so as to be leading to external openings 52*a* (second set of openings) are distributed over the periphery of the combustion chamber injection nozzle 12, whereas the torch channels 52 are connected on the one hand to the external openings 52*a* in outer circumferential surface 47 of the combustion chamber injection nozzle 12, and thus in the installed position, also to the main combustion chamber 11, and lead, on the other hand, to the annular pre-combustion chamber groove 50, as shown in the section of FIG. 7. The torch channels 52 connect the pre-combustion chamber 15 to the main combustion chamber 11 via the pre-combustion chamber groove 50 and the pre-combustion chamber line 51. The openings 52*a* of the torch channels 52 are preferably embodied to produce a substantially radial inflow from the torch channels 52 into the main combustion chamber 11 is produced, it also being possible a tangential inflow component here, too.

The torch channels 52 are preferably arranged in the same axial position and between two injection channels 37 adjacent in the circumferential direction, but they can also be arranged, for example, above or below the respective injection channels 37, even without offset in the circumferential direction. Any combination of these arrangements is also conceivable. But it is advantageous that there is an optimal spatial distribution of the injection channels 37 and the torch channels 52 in order to enable the formation of a high number of well-distributed diffusion flames in the main combustion chamber 11. It is especially preferable that the injection channels 37 and the torch channels 52 are arranged in approximately the same axial position and next to each other so as to alternate in the circumferential direction, as indicated particularly in FIG. 8.

Figure 9:
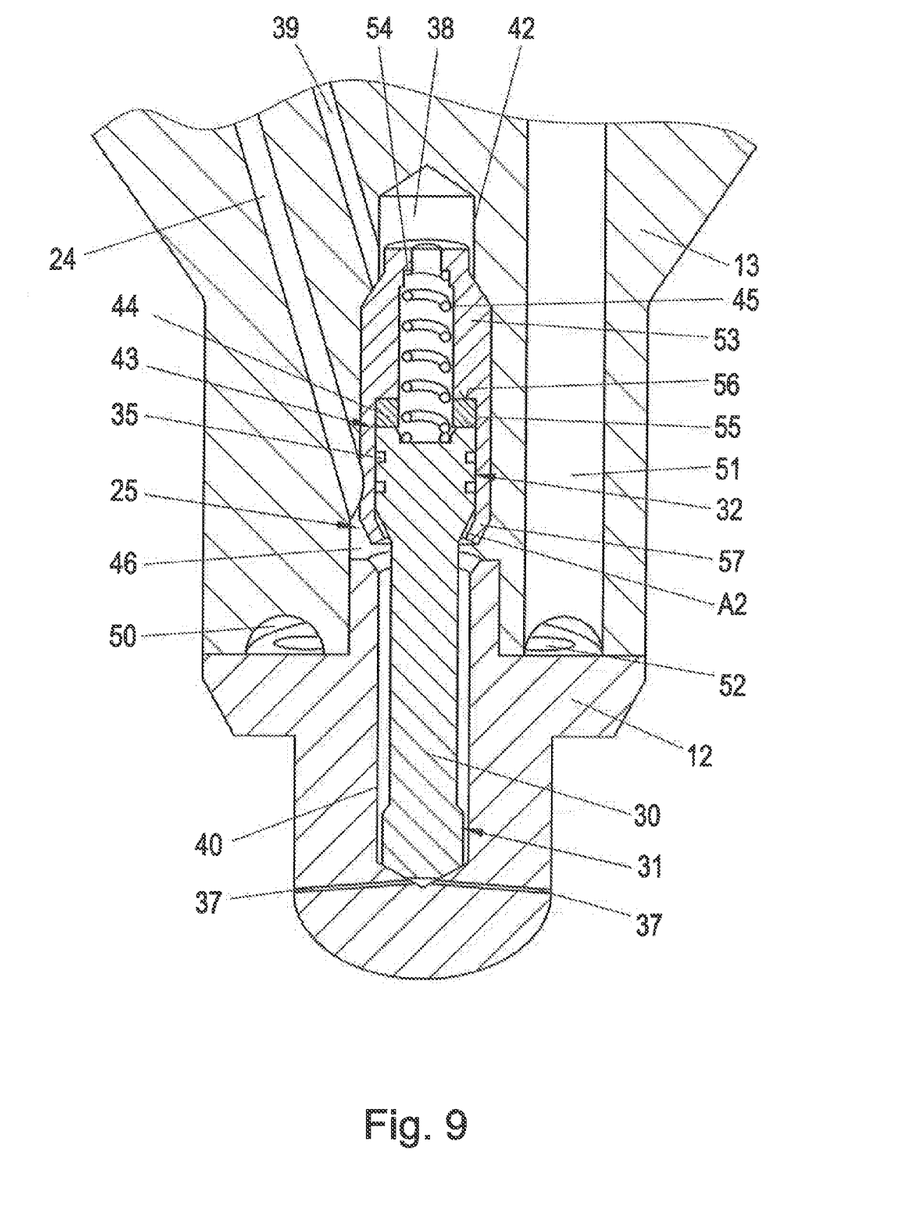

FIG. 9 describes another alternative embodiment of the mechanical valve 25. The substantial difference here is that the mechanical, differential pressure-actuated valve 25 has a valve housing 53 in which the valve spring 45 and the second piston 32 are arranged. In this embodiment, the stop pin 34 has also been omitted. A spring stop 54, here in the form of a radial step, is provided at a first end of the valve housing 53 facing away from the valve tappet 30, against which the valve spring 45 rests axially with one end. The valve spring 45 rests with the other end against the free end face 55 of the second piston 32. For this purpose, a recess can also be provided in the end face 55 for centering the valve spring 45, as indicated in FIG. 9. The valve spring 45 thus exerts a spring force again in the closing direction of the mechanical valve 25 that presses the valve tappet 30 against the valve sealing surface 41, thus also ensuring a defined position of the valve tappet 30. The valve spring 45 could also be omitted as described above, however. A valve stop 56, here in the form of a radial step, is provided in the valve housing 53 that forms the stop 43 of the mechanical valve 25. In this embodiment as well, a stop ring 44 can be arranged so as to rest axially on the valve stop 56 in order to allow the position of the stop 43 to be adjusted. In this case, the stop ring 44 would form the valve stop 56. The decisive advantage of this embodiment lies in the fact that, by virtue of the valve stop 56, against which the second piston 32 rests with its end face 55 in the open position of the mechanical valve 25 (shown in FIG. 9), a reliable seal is achieved in relation to the highly pressurized main fuel gas in the control chamber 46. If main fuel gas is fed via the main fuel gas feed line 24 under high pressure into the control chamber 46, this pressure acts on the valve surface A2 of the second piston 32 and lifts the valve tappet 30 against the spring force and against the pressure acting in the spring chamber 38 from the valve sealing surface 41 until the end face 55 of the second piston 32 rests axially against the valve stop 56. As a result, main fuel gas can no longer escape into the spring chamber 38, whereby the leakage of main fuel gas can be reduced. Apart from that, the sealing elements 35 perform the sealing function here as well as described above.

The valve housing 53 also makes it possible to adapt the material (dynamic loading as a result of valve impact at stop, thermal expansion, etc.) and the processing (surfaces, coatings, running characteristics, etc.) to the requirements of the mechanical valve 25, all independently of the specific embodiment of the fuel gas feed and ignition apparatus 10.

The mechanical valve 25 can thus also be produced as an exchangeable insert that can easily be changed out if worn, since, in this embodiment, the fuel gas feed and ignition apparatus 10 is not subjected to any wear brought about by the mechanical valve 25. The valve housing 53 is arranged in the control recess 42 for this purpose, for example, preferably via a press-fit in order to ensure sufficient retention and a sufficient sealing function between valve housing 53 and control recess 42.

The second axial end 57 of the valve housing 53 can also be formed in order to form a shoulder that holds the valve tappet 30 in the valve housing 53 without a securing element. The shoulder can easily be produced through flanging, for example.

In an embodiment of the fuel gas feed and ignition apparatus 10 with the same medium for ignition fuel for the pre-combustion chamber 15 and for main fuel gas and with a leakage line 39 that is connected to the ignition fuel supply line, the sealing elements 35 can also be omitted in another embodiment. During the closing of the mechanical valve 25, a pressure is captured in the control chamber 46 that depends on the combustion pressure in the main combustion chamber 11. Due to the necessary diameter tolerances, a small gap is inevitably formed between the second piston 32 and the control recess 42. In the closed state of the as mechanical valve 25, pressure equilibration can thus occur between the leakage line 39 and the main fuel gas feed line 24 via this small gap. A defined, repeatable state can thus be produced in the mechanical valve 25 at the beginning of the injection. This pressure equilibration thus ensures greater cyclical stability independently of the combustion pressure in the main combustion chamber 11 at the end of the main fuel gas injection when the mechanical valve 25 is closed, and independently of the current load of the gas engine 1.

The preferred function of the fuel gas feed and ignition apparatus 10 according to the invention will now be described below.

Figure 8:
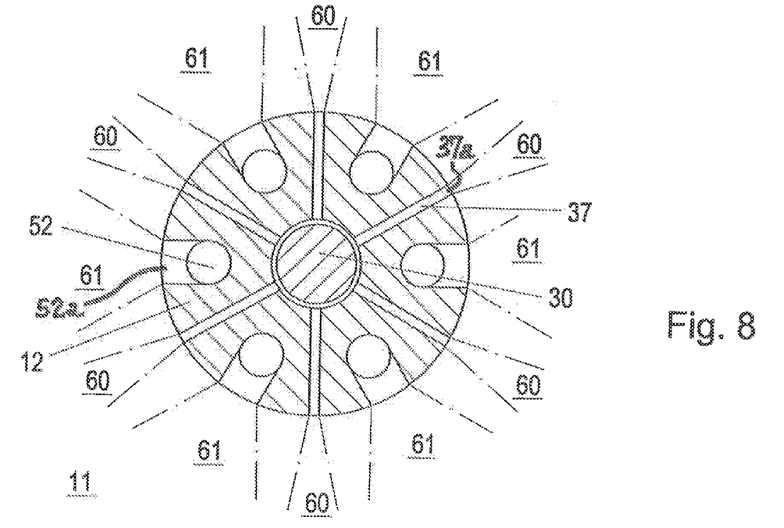
FIG. 8 shows a cross section of the combustion chamber injection nozzle.

During the suction stroke, air—or, equivalently, an air/exhaust gas mixture in the case of exhaust gas recirculation—flows into the cylinder 5. In the subsequent compression stroke, the air is compressed, and the compressed air is pressed from the cylinder 5 via the torch channels 52, the pre-combustion chamber groove 50 and the pre-combustion chamber line 51 into the pre-combustion chamber 15. A desired quantity of ignition fuel is injected via the pre-combustion chamber valve 18 into the pre-combustion chamber 15. The Injected ignition fuel mixes in the pre-combustion chamber 15 with the compressed air contained therein. A gaseous fuel is used as the ignition fuel for the pre-combustion chamber 15, preferably the same medium that is used as the main fuel gas. The pressure of the ignition fuel must of course be greater than the effective pressure in the pre-combustion chamber 15. The ignition fuel is injected by means of the pre-combustion chamber valve 18 in a quantity such that it is certain that no premature, undesired ignition can occur with the lean ignition fuel/air mixture created in the pre-combustion chamber 15. The metering can be done as a function of the current load state and of the ignition fuel characteristics, for example through the engine control. At the correct ignition time (generally before top dead center of the piston 6), the ignition fuel/air mixture in the pre-combustion chamber 15 is ignited with the external ignition device 16. The gas engine 1 according to the invention is thus an externally ignited gas engine. In a period of time that is advantageous for optimal combustion, main fuel gas is injected via the main fuel gas valve 21 and the injection channels 37 into the main combustion chamber 11 as described above. By virtue of the injection channels 37 distributed over the periphery, the main fuel gas is injected in a star shape in the radial direction into the main combustion chamber 11, as indicated in FIG. 8 by the main fuel gas jet 60. Because of the ignition of the ignition fuel/air mixture in the pre-combustion chamber 15, hot combustion gas emerges from the torch channels 52. As a result of the torch channels 52 distributed over the periphery, the hot combustion gas enters the main combustion chamber 11 in a star shape in the radial direction, as indicated in FIG. 8 by the combustion gas jet 61. The pure, injected main fuel gas jet 60 comes into contact with the hot combustion gas jet 61 in the main combustion chamber 11, whereby the main fuel gas in the main combustion chamber 11 is ignited and a plurality of spatially distributed diffusion flames are formed in the main combustion chamber 11. The diffusion flames quickly draws in the available oxygen, thus achieving stable, good and fast combustion in the main combustion chamber 11. The start of the injection of main fuel gas can be controlled via the main fuel gas valve 21, for example as a function of the current load of the gas engine 1. The injection, the duration of which is determined first and foremost by the current load, generally also extends for a certain amount of time after the ignition in the pre-combustion chamber 15. The ignition in the pre-combustion chamber 15 and the start and duration of the main injection through the injection of fuel gas into the main combustion chamber 11 can be controlled independently of one another, for example by the engine control.

Using the controlled main fuel gas valve 21, the quantity of the main fuel gas supplied can be adapted to the current load state and to the fuel gas characteristics and can be precisely metered, for example again using the engine control unit ECU. It is thus also possible to react quickly to rapid load changes.

As described above, the main fuel gas injection is preferably performed by means of a pre-controlled mechanical, differential pressure-actuated valve 25 that is embodied as a differential piston. In a preferred embodiment, the rear side of the second piston 32 (surface A3) communicates via the leakage line 39 and the spring chamber 38 with the supply pressure of the ignition fuel of the electronic pre-combustion chamber valve 18. The piston surfaces A1, A2 of the differential piston are acted upon for the short time span of the opening of the main fuel gas valve 21 by the gas pressure of the main fuel gas, whereas the gas pressure of the main fuel gas being selected so as to be so much greater than the pressure of the ignition fuel for the pre-combustion chamber 15 that, under all circumstances, reliable opening of the mechanical valve 25 is ensured in cooperation with the compression pressure in the main combustion chamber 11 (that acts on the piston 31 via the injection channels 37). The function of the mechanical valve 25 can thus be ensured only by adjusting the pressures of the main fuel gas and of the ignition fuel for the pre-combustion chamber 15.

The pressure of the main fuel gas must of course be greater than the expected compression pressure at the time of the injection of the main fuel gas. During combustion, main fuel gas is injected into the main combustion chamber 11, so the pressure of the main fuel gas must of course also be greater than the expected combustion pressure. The injection of main fuel gas into the main combustion chamber 11 should of course continue no longer than oxygen is available for combustion.

As a result of the lean mixture and the acting high pressure in the pre-combustion chamber 15, a high-performance spark ignition may be required in order to provide the necessary ignition energy and ignition voltage, e.g., in the form of a modulated capacitive ignition as described in DE 10 2008 006304 A1, or in the form of a corona, plasma or laser ignition, or the like. Likewise, it is possible that the ignition in the pre-combustion chamber 15 is monitored by monitoring the ionization current, as described in WO 2013/045288 A1, for example.

Another especially advantageous embodiment of the invention results from using multiple injections of ignition fuel into the pre-combustion chamber 15. A quantity of ignition fuel is first injected into the pre-combustion chamber 15, thus establishing an ignition fuel/air mixture that is so lean that it certainly cannot ignite prematurely. Just before ignition, another injection of ignition fuel is performed, which enriches the mixture in the immediate vicinity of the external ignition device 16 in the pre-combustion chamber 15 to the point that reliable ignition, optionally also with less ignition energy, is achieved with the external ignition device 16. Through the additional supply of ignition fuel before ignition having a substantially lower temperature than the compressed mixture in the pre-combustion chamber 15, the ignition fuel/air mixture is additionally cooled, thus reducing the danger of undesired auto-ignition as a result of the additional injection of Ignition fuel. If liquefied gas (e.g. natural gas) is used as the ignition fuel that is pressurized in the cryogenic liquid phase, e.g. at about −160° C., and vaporized before injection, thus also rendering the resulting gas cryogenic, a substantial drop in the temperature of the mixture in the pre-combustion chamber 15 can be achieved.

Preferably, but not necessarily, the same medium is used as the main fuel gas and as the ignition fuel, e.g. natural gas, particularly liquefied natural gas, in which case it is possible that only different pressures are required for the Ignition fuel for the pre-combustion chamber 15 and the main fuel gas for the main fuel chamber 11.

FIG. 10 shows a possible overall configuration. The gas engine 1 is controlled by an engine control unit ECU (indicated by the arrows). Using the engine control unit ECU, particularly the pre-combustion chamber valve 18 and the main fuel gas valve 21 are controlled, above all the respective start of injection and end of injection as a function of the pressures p1, p2 of the main fuel gas and of the ignition fuel and of a current load state of the gas engine (e.g. a torque and/or a speed at the drive shaft of the gas engine 1). The pre-combustion chamber valve 18 is connected via a suitable gas line to an ignition fuel storage tank 70 for ignition fuel. The main fuel gas valve 21 is connected via a suitable gas line to a main fuel gas tank 71 for main fuel gas. If the same medium is used for the main fuel gas and the ignition fuel, it is also possible to provide only one tank for both. The engine control unit ECU also controls the external ignition device 16, particularly the ignition time and/or the ignition energy, optionally also via a separate ignition control device 72. In some circumstances, it is also possible to set a pressure p1, p2 of the main fuel gas and/or of the ignition fuel via the engine control unit ECU, for example using a sufficiently known pressure regulation device (not shown).

The invention claimed is:

1. A fuel gas feed and ignition apparatus for a gas engine, said apparatus comprising:

an injector nozzle having a plurality of injection channels for a main fuel gas, said injection channels extending to a first set of openings in a periphery of the nozzle, and a plurality of separate torch channels which extend through the injector nozzle to a second set of openings in the nozzle periphery, and a housing defining an pre-combustion fuel chamber which connects with the plurality of torch channels, an ignition fuel feed line which extends to the pre-combustion chamber, a first electronically actuated and controlled valve located in the ignition fuel feed line, a main fuel gas feed line, a second electronically actuated and controlled valve located in the main fuel gas feed line, and a mechanical, differential pressure-actuated valve located in the main fuel gas feed line between the second valve and the plurality of injection channels, the mechanical, differential pressure-actuated valve being controlled by pressure of the main fuel gas to block or unblock main fuel gas flow to the plurality of injection channels.

2. The apparatus according to claim 1, wherein the openings of the first set of openings alternate in a circumferential direction with the openings of the second set of openings.

3. The apparatus according to claim 1, wherein the injection nozzle is elongated and wherein said first and second sets of openings are substantially located at a common axial position along the injection nozzle.

4. The apparatus according to claim 1, wherein the first and second sets of openings are radially aligned.

5. The apparatus according to claim 1, wherein the housing defines an annular pre-combustion chamber groove and a pre-combustion chamber line that extends from the pre-combustion chamber to the pre-combustion chamber groove, said torch channels communicating with the pre-combustion chamber groove.

6. The apparatus according to claim 5, wherein the mechanical valve comprises a valve tappet having a first piston at an axial end thereof, a second piston axially spaced from the first piston, a shaft interconnecting the first and second pistons, and a piston sealing surface on the first piston, the housing defining a sealing surface against which the piston sealing surface can move, and a control chamber between the first and second pistons, the main gas fuel line extending to the control chamber.

7. The apparatus according to claim 6, wherein the housing defines a control recess and wherein a circumferential surface of the second piston can seal against the control recess.

8. The apparatus according to claim 7, wherein the valve tappet includes a stop pin at an end opposite the first piston, and the housing includes a stop for cooperating with the stop pin.

9. The apparatus according to claim 8, including a valve spring surrounding the stop pin and extending between the second piston and the stop.

10. The apparatus according to claim 6, including a valve housing positioned around the second piston, said valve housing including a valve stop that sealingly cooperates with an end face of the second piston.

11. The apparatus according to claim 10, including a valve spring between the end face of the second piston and the valve housing.

12. The apparatus according to claim 6, including a plurality of sealing elements on a circumferential surface of the second piston.

13. The apparatus according to claim 6, wherein the housing defines a leakage line which extends to an end of the control recess facing away from the control chamber and closed off by the second piston.

14. The apparatus according to claim 13, wherein the leakage line extends to the ignition fuel feed line.

15. The apparatus according to claim 1, including a main fuel gas valve in the main fuel gas feed line and a pre-combustion chamber valve in the ignition fuel feed line, at least one of said main fuel gas valve and said pre-combustion chamber valve comprising an electrically-actuated, electronically-controlled valve.

16. A method for operating a combination of a gas engine defining a cylinder with a reciprocating piston and defining a main combustion chamber, and a cooperating fuel gas feed and ignition apparatus defining a pre-combustion chamber, an ignition fuel inlet, and a main fuel gas inlet, the method comprising the steps of:

a. during a compression stroke of the piston, compressing air or an air/exhaust gas mixture in the cylinder and pressing the compressed air into the pre-combustion chamber, b. supplying ignition fuel to the pre-combustion chamber to provide an air/ignition fuel mixture, c. before the end of the compression stroke, supplying main fuel gas into the main combustion chamber, d. again supplying ignition fuel to the pre-combustion chamber to enrich the air/ignition fuel mixture in the pre-combustion chamber, and e. igniting the air/ignition fuel mixture in the pre-combustion chamber, said ignited air/ignition fuel mixture flowing into the main combustion chamber to ignite the main fuel gas in the main combustion chamber.

* * * * *